(12) United States Patent
Vadella et al.

(10) Patent No.: US 12,182,526 B2
(45) Date of Patent: Dec. 31, 2024

(54) INTERACTIVE GRAPHICAL INTERFACES FOR EFFICIENT LOCALIZATION OF NATURAL LANGUAGE GENERATION RESPONSES, RESULTING IN NATURAL AND GRAMMATICAL TARGET LANGUAGE OUTPUT

(71) Applicant: GOOGLE LLC, Mountain View, CA (US)

(72) Inventors: Katherine Vadella, San Jose, CA (US); Joshua Andrews, Santa Clara, CA (US); Max Copperman, Santa Cruz, CA (US); Gabrielle Gayles, San Francisco, CA (US); Shanjian Li, Vancouver (CA); Jieyu Lu, San Mateo, CA (US); Luchuan Xu, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 256 days.

(21) Appl. No.: 17/318,704

(22) Filed: May 12, 2021

(65) Prior Publication Data
US 2022/0366154 A1 Nov. 17, 2022

(51) Int. Cl.
*G06F 40/58* (2020.01)
*G06F 40/47* (2020.01)
*G06N 5/02* (2023.01)

(52) U.S. Cl.
CPC .............. *G06F 40/58* (2020.01); *G06F 40/47* (2020.01); *G06N 5/02* (2013.01)

(58) Field of Classification Search
CPC ........ G06F 40/58; G06F 40/47; G06F 40/186; G06N 5/02
See application file for complete search history.

(56) References Cited

U.S. PATENT DOCUMENTS 9,043,198 B1 * 5/2015 Black ................... G06F 40/274
704/9
11,922,344 B2 * 3/2024 Birnbaum .......... G06Q 30/0201
(Continued)

OTHER PUBLICATIONS

Espinoza, Mauricio, et al. "LabelTranslator: A System for Localizing Ontologies in Collaborative Settings." (2009). pp. 1-15. (Year: 2009).*
(Continued)

*Primary Examiner* — Jesse S Pullias
*Assistant Examiner* — Michael C. Lee
(74) *Attorney, Agent, or Firm* — Gray Ice Higdon

(57) ABSTRACT

Implementations relate to effectively localizing system responses, that include dynamic information, to target language(s), such that the system responses are grammatical and/or natural in the target language(s). Some of those implementations relate to various techniques for resource efficient generation of templates for a target language. Some versions of those implementations relate to resource efficient generation of target language natural language generation (NLG) templates and, more particularly, to techniques that enable a human user to generate a target language NLG template more efficiently and/or with greater accuracy. The more efficient target language NLG template generation enables less utilization of various client device resources and/or can mitigate the risk of flawed NLG templates being provided for live use in one or more systems.

20 Claims, 10 Drawing Sheets

(56) References Cited

U.S. PATENT DOCUMENTS

| | | | | |
|---|---|---|---|---|
| 2006/0100847 | A1* | 5/2006 | McEntee | G06F 40/143 |
| | | | | 704/4 |
| 2008/0208567 | A1* | 8/2008 | Brockett | G06F 40/253 |
| | | | | 704/9 |
| 2009/0132500 | A1* | 5/2009 | Jones | G06F 16/957 |
| 2012/0123765 | A1* | 5/2012 | Estelle | G06F 40/284 |
| | | | | 704/E13.011 |
| 2013/0124985 | A1* | 5/2013 | Doshi | G06F 9/454 |
| | | | | 715/256 |
| 2013/0132066 | A1* | 5/2013 | Eldawy | G06F 40/47 |
| | | | | 704/E11.001 |
| 2014/0358519 | A1* | 12/2014 | Mirkin | G06F 40/47 |
| | | | | 704/2 |
| 2015/0161115 | A1* | 6/2015 | Cuthbert | G06F 40/47 |
| | | | | 704/2 |
| 2015/0186551 | A1* | 7/2015 | Badimon | G06F 16/90332 |
| | | | | 707/767 |
| 2016/0085746 | A1* | 3/2016 | Ni | G06F 40/58 |
| | | | | 704/2 |
| 2020/0394271 | A1* | 12/2020 | Bihani | G06F 40/58 |
| 2021/0034814 | A1* | 2/2021 | Aggarwal | G06F 40/205 |
| 2021/0390249 | A1* | 12/2021 | Breber | G06F 3/04847 |
| 2022/0261139 | A1* | 8/2022 | Phoutchanthavongsa | |
| | | | | G06F 9/451 |
| 2022/0318523 | A1* | 10/2022 | Sheinin | G06F 40/45 |

OTHER PUBLICATIONS

Stevens, Luke, et al. "The Truth About HTML5 Forms." The Truth About HTML5 (2014): 67-79 (Year: 2014).*

Inter-Illusion, Localize Component—"Plurals", available at https://web.archive.org/web/20200718020658/http://inter-illusion.com:80/assets/I2LocalizationManual/Plurals.html (archived on Jul. 18, 2020) (Year: 2020).*

Inter-Illusion Documentation—"Features", available at https://web.archive.org/web/20200717052707/http://inter-illusion.com:80/assets/I2LocalizationManual/Features.html (archived Jul. 17, 2020). (Year: 2020).*

* cited by examiner

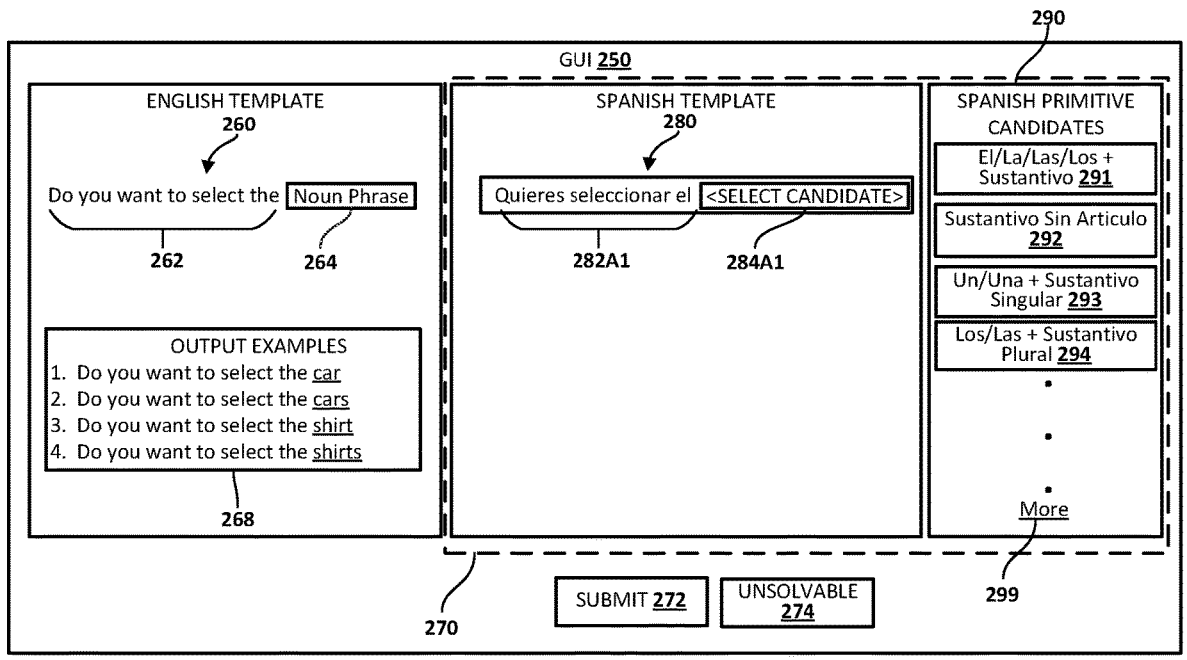
FIG. 2A1

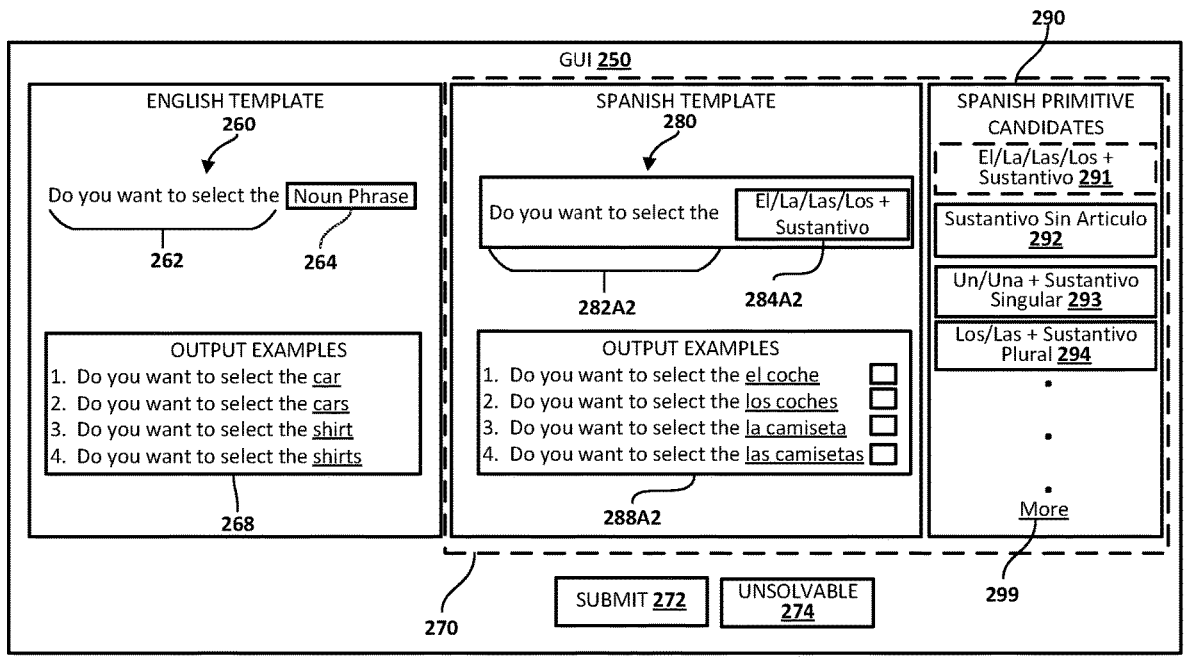
FIG. 2A2

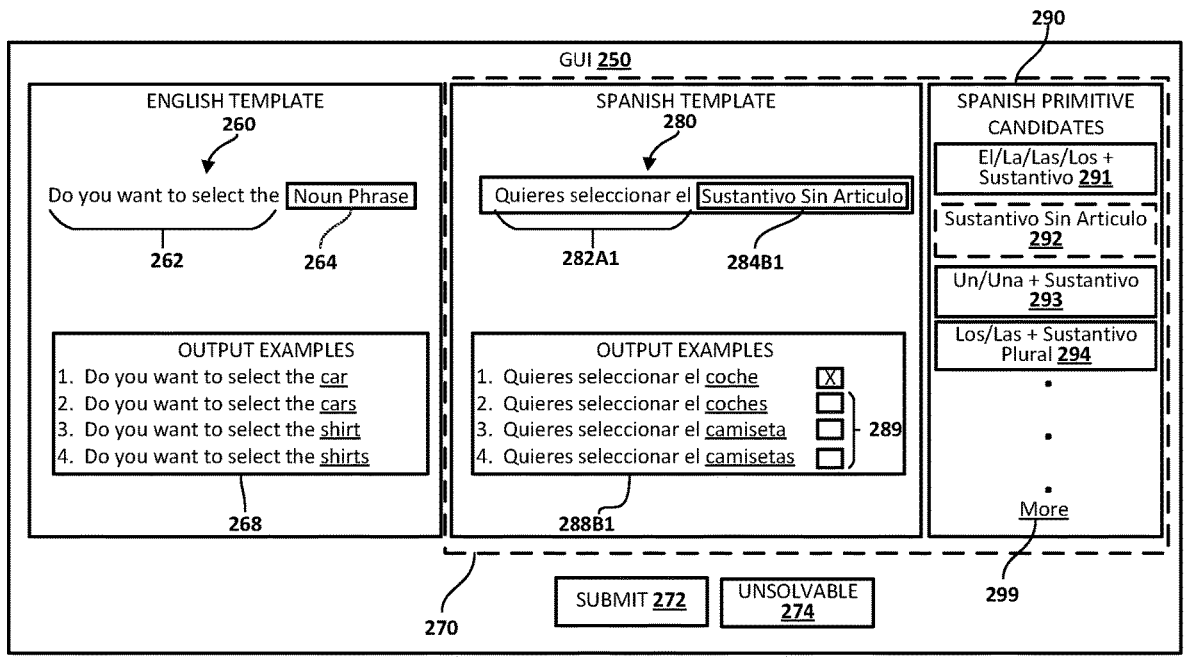
FIG. 2B1

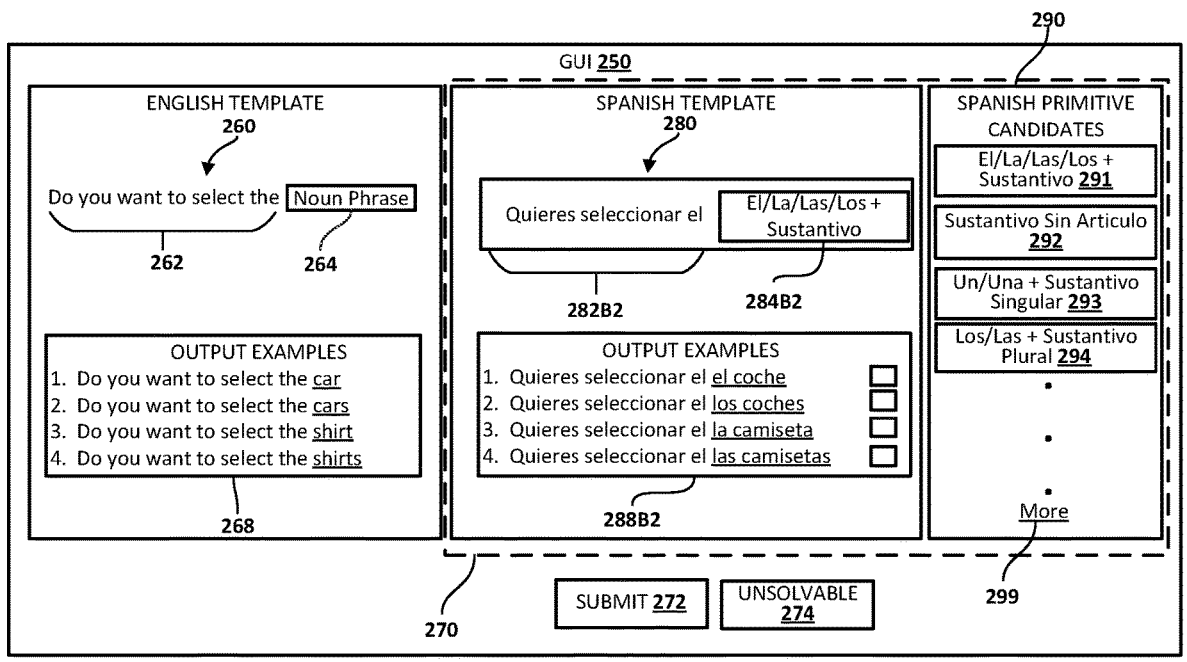
FIG. 2B2

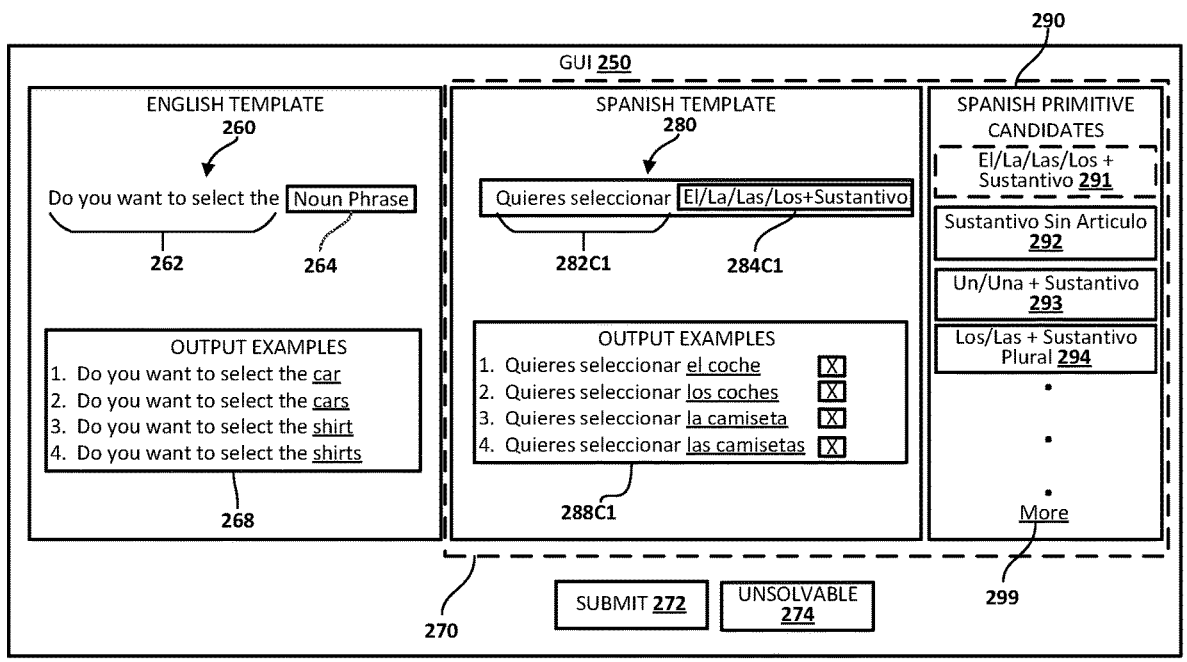
FIG. 2C1

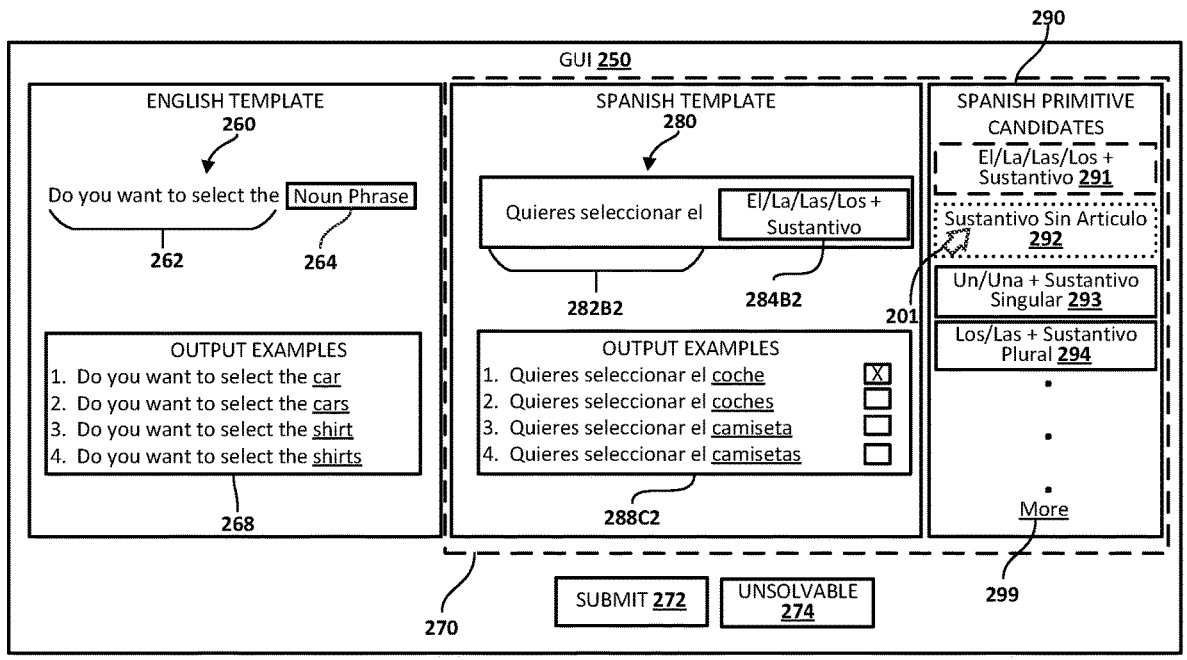
FIG. 2C2

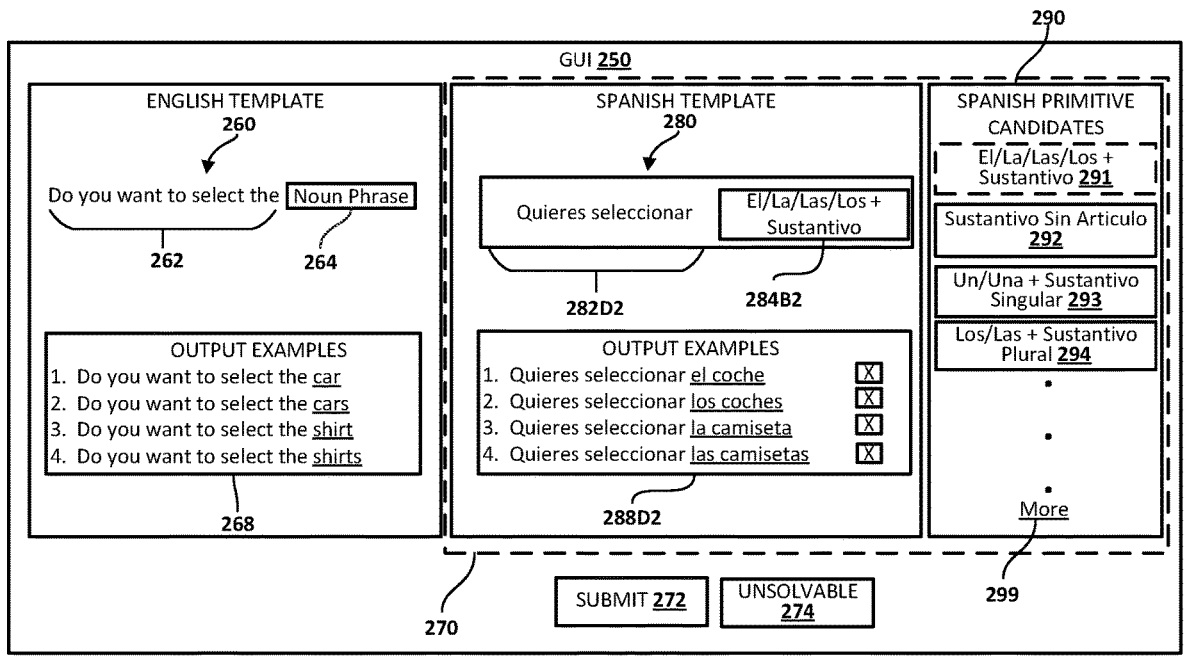
FIG. 2D2

INTERACTIVE GRAPHICAL INTERFACES FOR EFFICIENT LOCALIZATION OF NATURAL LANGUAGE GENERATION RESPONSES, RESULTING IN NATURAL AND GRAMMATICAL TARGET LANGUAGE OUTPUT

BACKGROUND

In interactions between humans and automated assistants and/or other computer system(s), the system can proactively or reactively provide natural language output. Such natural language output can be in the form of displayed text and/or synthesized speech that is generated based on corresponding text.

Generative machine learning models have been proposed that can process structured data and generate corresponding natural language output. However, such generative models can generate unpredictable natural language output (e.g., can generate natural language output that lacks grammaticality), which can potentially be confusing (or even offensive) to a corresponding user and, as a result, can undesirably prolong (or even abruptly end) an ongoing interaction between a human and a corresponding computer program. Moreover, such generative models are typically only available for a limited quantity of languages, and it can be resource intensive to accumulate and/or label enough training data for training generative models for other language(s). Accordingly, localizing system responses for other language(s), by training generative model(s) for the other language(s), can be resource intensive. Yet further, when the output of the generative models is translated from a source language, of the generative model, to a different target language, semantic(s) of the output can inadvertently be changed in the target language output and/or the target language output may not be grammatical and/or natural—making it difficult (or impossible) for a corresponding user to understand the translated target language output. Accordingly, localizing system responses, for a target language, by translating source language system response counterparts, can result in non-grammatical and/or non-natural target language system responses.

Natural language generation (NLG) templates have also been proposed for generating natural language output. Such NLG templates can be used as an alternative to generative machine learning models and/or as an alternative to other approach(es) for generating natural language output. Such NLG templates often include static text and one or more variable portions. A variable portion can include a placeholder to be filled with corresponding structured data and/or can include regular expression(s) and/or other code that can define other text to include in dependence on the corresponding structured data. For example, an NLG template for use by an automated assistant in responding to a "what's today's temperature" utterance from a user can be of the form "The forecasted high is [High_Temp] and the low is [Low_Temp]." In such an example, the "[High_Temp]" represents a variable portion that can be filled with a returned high temperature numerical value and the "[Low_Temp]" represents a variable portion that can be filled with a returned low temperature numerical value.

NLG templates have been developed for some languages, such as English. However, it can be very resource intensive (e.g., computational resource(s)) to adapt those NLG templates for additional languages. For example, due to variations between languages and nuanced complexities of various languages, it can be impossible to simply auto-translate NLG templates from a source language to a target language. For instance, an English language template of "Choose one [English Singular Noun Phrase]" cannot simply be translated to a Spanish template of "elige un [Spanish Singular Noun Phrase]" since "un" would only be appropriate when the "Spanish Singular Noun Phrase" is masculine—thereby leading to incorrect natural language output when the "Spanish Singular Noun Phrase" is feminine (in which case "una" would be appropriate).

Accordingly, generating NLG templates for additional languages can be a laborious manual exercise. Further, it can require an individual (e.g., a computational linguist) with deep knowledge of a source language, a target language, linguistic phenomena, and an understanding of code that may need to be handcrafted and included in some placeholders. Not only are individuals with such skills sparse, it can still take such individuals an extensive amount of time to review a source language template and/or to craft and/or refine a target language template. This can result in extensive utilization of computational resources, such as client device resources required to render corresponding graphical interface(s) during the extensive amount of time. Moreover, even such individuals can be prone to errors that can be difficult to catch due to linguistic complexities, resulting in flawed NLG templates being utilized in various systems. Utilization of a flawed NLG template in a system can undesirably prolong (or even abruptly end) an ongoing interaction between a human and the system.

These and/or other drawbacks can make it difficult to effectively localize system responses, that include dynamic information, to target language(s), such that the system responses are grammatical and/or natural in the target language(s).

SUMMARY

Implementations disclosed herein relate to various techniques for effectively localizing system responses, that include dynamic information, to target language(s), such that the system responses are grammatical and/or natural in the target language(s). Some of those implementations relate to various techniques for resource efficient generation of templates for a target language. Some versions of those implementations relate to resource efficient generation of target language natural language generation (NLG) templates and, more particularly, to techniques that enable a human user to generate a target language NLG template more efficiently (e.g., in less clock on the wall time and/or with a reduced quantity of user inputs), and/or with greater accuracy. The more efficient target language NLG template generation enables less utilization of various client device resources, such as battery, memory, and/or processor resources required to render graphical interface(s) during creation of the template. Moreover, the more accurate target language NLG template generation can mitigate the risk of flawed NLG templates being provided for live use in one or more systems and/or can ensure utilized target language NLG templates result in generation of grammatical and/or natural target language system responses. Yet further, various techniques disclosed herein enable a translator (vs. a more skilled linguist) to generate a target language NLG template via interaction(s) with a graphical user interface (GUI) and review of target language output examples—and without necessitating detailed interaction(s) (or any interaction(s)) directly with the target language NLG template.

In some implementations, a GUI is generated that includes a previously curated and previously verified source language NLG template and/or that includes a source language output example portion. The source language NLG template, when provided in the GUI, includes source static text that is in the source language and optionally includes one or more source language primitives. Each source language primitive, when provided, serves as a placeholder and defines one or more arguments and one or more constraints that are utilized in dynamically generating corresponding text based on corresponding structured data. The argument(s) and constraint(s) of a source language primitive can define the linguistic attributes via which dynamic text is generated using the source language primitive. It is noted that, when the source language NLG template lacks any source primitive, its generated target language NLG template counterpart can nonetheless optionally include target language primitive(s). For example, the target language primitive(s) can be specified for the target language NLG template, by a translator and through interactions with the GUI, despite the corresponding source language NLG template lacking any source primitive.

Each argument of a source language primitive can be replaced with text that corresponds to a selected entity for an instantiation of the source language NLG template. One or more of the constraint(s) of the source language NLG template can include constraint(s) on the argument, such as constraint(s) that restrict the candidate entities from which a selection can be made for an instantiation of the source language NLG template. For example, the constraint(s) can include taxonomic classification(s) that restrict the argument to being replaced with texts that correspond to entities having those taxonomic classification(s). For instance, the taxonomic classification(s) can include more general classification(s) such as "noun phrase" and/or more specific classification(s) such as "actor", "sports team", "city", or "North American city". A source language primitive can include additional and/or alternative constraint(s), such as constraint(s) that reference other primitive(s) of the NLG template (e.g., to ensure number agreement), case constraint(s) (e.g., nominative, accusative), definiteness constraint(s), preposition constraint(s), and/or other constraint(s). Such additional and/or alternative constraints can restrict dynamic text that is generated using the source language primitive, such as dynamic text that is in addition to text that corresponds to a selected entity.

As one example, the source language NLG template can be of the form "It looks like [a/an+Singular English Noun Phrase]", where "It looks like" is static text, and "[a/an+ English Noun Phrase]" represents the source language primitive. The source language primitive can define a "singular noun phrase" taxonomic classification and can optionally define other constraint(s), such as an "indefinite" constraint for singular noun phrases. In English, an "indefinite" constraint indicates the singular noun phrase should be preceded by "a" or "an" (vs. "the" with an "indefinite" constraint). When the source language primitive defines a singular noun phrase taxonomic classification and an indefinite constraint, then dynamically generated text generated using the primitive will include an English singular noun phrase that corresponds to structured data, and the noun phrase will be preceded by an "a" or an "an" (in dependence on the noun phrase).

The source language NLG template that is presented in the GUI can include the source static text in its entirety and either all details of the source language primitive(s) (e.g., the underlying full representation of the primitive(s)) or, alternatively, a higher-level representation of the source language primitive(s) (e.g., a more readily human interpretable semantic representation thereof). As one example, as opposed to including the underlying regular expression or other full representation of a source language primitive, the source language NLG template can include the more readily interpretable "a/an+Singular English Noun Phrase". For example, a user that understands the source language (e.g., a non-linguist user) and that is not extensively trained in coding can readily interpret, from "a/an+Singular English Noun Phrase", that the source language primitive defines an English singular noun phrase preceded by an "a" or an "an". In contrast, it would take more time (or be impossible) for the user to interpret underlying code if the underlying code was all that was presented. Accordingly, by presenting higher-level representations of source language primitive(s), a goal for a corresponding target language NLG template can be more readily understood, enabling the target language NLG template to be more efficiently and/or accurately generated.

The source language output example portion, when included, can include a plurality of source language output examples, that are in the source language and that are generated based on the source language NLG template. Each of the source language output examples can include the current source static text (if any) and can include corresponding text, for each of the source language primitives, that are each generated based on a respective entity and based on corresponding constraint(s) for the source language primitive. The entities on which the source language output examples are generated can be the same on which the target language output examples (described below) are based. However, source language text that corresponds to the entities will be utilized in lieu of target language text that corresponds to the entities.

In addition to including the already curated and verified source language NLG template and/or the source language output example portion, the GUI can also include an interactive target language NLG template portion. The interactive target language NLG template portion can include an area for defining the target language NLG template, and the area can include editable target static text with which a user can interact to define target static text, for a target language NLG template, that is in the target language. In some implementations, initial target language text can be provided, using a machine translation, and the user can optionally edit the initial target language text. Instead of or in addition to using a machine translation of the source language text to generate the initial target language text, stored translations from other translator(s) of similar (or the same) source language text can be utilized.

The interactive target language NLG template portion can also include a plurality of candidate target language primitives, any one (or more) of which can be selected by a user for inclusion in the target language NLG template. For example, the candidate target language primitives can be represented as graphical elements with corresponding higher-level descriptors, and can be dragged (e.g., through a touch gesture or mouse-based gesture) into an appropriate position in the area for defining the target language NLG template. As another example, the candidate target language primitives can be represented in a drop-down menu that is accessible from within the area for defining the target language NLG template.

As with the source language primitives, the target language primitives can define arguments and constraint(s). For example, a target language primitive can define an argument that includes a "noun phrase" constraint, and can define a "definite" constraint for the noun phrase constraint. In Spanish, the "definite" constraint indicates the noun phrase should be preceded by "el" (if singular masculine noun phrase), "la" (if singular feminine noun phrase), "los" (if plural masculine noun phrase), or "las" (if plural feminine noun phrase).

As with the source language primitive(s), the representation of a target language primitive in the GUI can be with either all details (e.g., the underlying code) or, alternatively, a higher-level representation of the target language primitive. As one example, and continuing with the example from the prior paragraph, as opposed to including the underlying regular expression or other full representation, the aforementioned target language primitive can be represented by the more readily interpretable "el/la/los/las+Spanish Noun Phrase". The higher-level representation can be readily interpreted by a translator (or other user that understands the target language) that is not extensively trained in coding, whereas it would take more time (or be impossible) for the translator (or other user that understands the target language) to interpret underlying code. Accordingly, by presenting a higher-level representation of a target language primitive, the effects of the target language primitive can be more readily understood, enabling the target language NLG template to be more efficiently and/or accurately generated and/or enabling non-linguist users to understand the effects of the target language primitive.

In some implementations, a score can be determined for each of the candidate target language primitives. In some of those implementations, the candidate target language primitives can be selected (from a larger corpus of candidates) for presentation in the GUI based on their scores. Additionally or alternatively, the candidate target language primitives can be presented, in the GUI, in a manner that is based on their scores. For example, where higher scores correspond to a greater degree of relevance than lower scores, higher scoring one(s) can be presented more prominently (e.g., higher up, with larger font, and/or with highlighting or other demarcation(s)) than lower scoring one(s).

In various implementations, the scoring of candidate target language primitives can be based on one or more feature(s) of the source language NLG template, such as some or all of the static text and/or some or all of the constraint(s) of the source language primitives, if any (e.g., taxonomic classification(s) of the source language primitive(s)—such as a "date" taxonomic classification). For example, a score can be generated, for a candidate target language primitive, as a function of how frequently it was selected for inclusion, in completed target language NLG template(s), where those completed target language NLG template(s) are for corresponding source language NLG template counterpart(s) having static text and/or constraint(s) that are the same (or similar to) those of the source language NLG template. Put another way, a score for a candidate target language primitive can be dependent on the source language NLG template for which the target language NLG template is being generated. Generally, the score for the target language primitive can be positively influenced if that candidate target language primitive was frequently utilized, as indicated by historical data, for past target NLG template(s) generated based on corresponding source language NLG template(s) having feature(s) in common with the current source language NLG template. In these and other manners, candidate target language primitive(s) can be presented and/or presented more prominently, in response to their score(s) indicating that they are likely to be utilized in the target language NLG template. This can enable a corresponding user to identify more relevant candidate target language primitive(s) more quickly and/or with a reduced quantity of (or even no) user input(s), thereby enabling more efficient target language NLG template generation.

In some implementations, the interactive target language NLG template portion can also include a target language output example portion. A plurality of output examples, that are in the target language, can be generated based on the currently defined target language NLG template. Each of the output examples can include the current target static text (if any) and can include respective text, for each of the current target language primitives, that are each generated based on a respective entity and based on corresponding constraint(s) for the target language primitive. As described herein, the respective entities on which the target language output examples are based can correspond to those on which the source language output examples are based. Generating and providing the target language output examples enables a user to quickly view examples generated using the currently defined target language NLG template and, from review of those examples, determine whether refinement of the currently defined target language NLG template is needed.

In some implementations, before a target language primitive is affirmatively selected for inclusion in the currently defined target language NLG template, a user can provide input that is directed to, but does not explicitly select, the target language primitive and, in response to such input, output examples can be generated based on that target language primitive (in lieu of a currently defined target language primitive, if any) and those output examples displayed. For example, hovering a mouse cursor over a given target language primitive can cause output examples to be generated (and displayed) that are based on the given target language primitive, but will not make the given target language primitive part of the currently defined target language NLG template. Rather, an alternate affirmative selection input (e.g., a left-click of mouse and/or a drag-and-drop (into a visual representation of the currently defined target language NLG template)), that is directed to the given target language primitive, can be required before the given target language primitive is included as part of the currently defined target language NLG template. As another example, a focus input directed to the given target language primitive can cause output examples to be generated (and displayed) that are based on the given target language primitive, but will not make the given target language primitive part of the currently defined target language NLG template. A focus input directed to the given target language primitive can include, for example, highlighting the given target language primitive element using an input method such as keyboard input, a voice input, or gaze input (e.g., an extended gaze at the given target language primitive).

In these and other manners, a translator user can quickly see output examples for a candidate target language primitive without necessitating it be explicitly selected first and, only after confirming the output examples are correct, then affirmatively select the candidate target language primitive for inclusion in the currently defined target language NLG template. This can enable review of various output examples more quickly and/or with a reduced quantity and/or duration of user input(s).

In some implementations that generate target language output examples, the entities (e.g., peoples, places, and things (e.g., dates and numbers)) based on which dynamic texts, for a target language primitive, are generated can be determined based on defined attribute(s) of the target language (e.g., to ensure that the target language output examples provide coverage for grammatical attribute(s) of the target language) and/or based on a taxonomic classification defined by constraint(s) of the target language primitive and/or its source language primitive counterpart (e.g., to ensure the target language output examples are semantically appropriate). For example, defined attributes for Spanish and for a noun phrase taxonomic classification can indicate that gender and grammatical number of the noun phrases is impactful. Accordingly, entities can be selected, for use in generating the target language output examples, based on those entities collectively having corresponding Spanish noun phrases that cover all genders and grammatical numberings, thereby ensuring the target language output examples provide coverage for linguistic attribute(s) of Spanish. For example, noun phrases of "coche" (masculine and singular), "coches" (masculine and plural), "camiseta" (feminine and singular), and "camisetas" (feminine and plural) can be selected based on collectively providing masculine, feminine, singular, and plural examples. It is noted that the selection of singular and plural noun phrases can impact definite articles ("el", "la", "los", "las"), for those noun phrases, that could be generated based on the target language primitive (or included in the target static text), thereby enabling review of the target output examples by a user to ensure appropriate conformance.

In some implementations, a curated database of linguistic attribute(s) and/or associated entities, for a given language, can be referenced in selecting entities that provide coverage for defined attribute(s) of the target language. Put another way, the curated database can be referenced to ensure that entities are selected such that the target language output examples demonstrate relevant linguistic attribute(s) of the target language. As one example, a curated database for Spanish can indicate which linguistic attribute(s) ensure coverage for a given target language primitive and/or can indicate entities that can be selected, for use in target language output examples, to demonstrate those linguistic attribute(s). The entities selected based on the curated database can be selected based on constraint(s) of the argument(s) for the target language primitive, other constraint(s) of the target language primitive, and/or static text of the target language NLG template.

As one particular example, a curated database for Spanish can indicate that, for noun phrases, relevant linguistic attributes include grammatical gender and grammatical number and/or can indicate entities that demonstrate different grammatical gender and/or grammatical number. For instance, the curated database can indicate at least one particular masculine and singular noun phrase entity, at least one particular masculine and plural noun phrase entity, at least one particular feminine and singular noun phrase entity, and indicate at least one particular feminine and plural noun phrase entity. Based on the indication that grammatical gender and grammatical number are relevant for noun phrases, the corresponding noun phrase entities, indicated in the curated database, can be selected for use in generating target language output examples to ensure the target output examples provide coverage for multiple grammatical genders and grammatical numbers. As another particular example, a curated database for English can indicate that, for location entities, relevant linguistic attributes include locative primitive (e.g., "in", "on", "at", or "by"). The curated database can further indicate at least one location entity that would use a first of the locative primitives (e.g., "Kentucky", which would use "in") and at least one location entity that would use a second of the locative primitives (e.g., "123 Main St.", which would use "at"). Based on the indication that the locative primitive is relevant for location entities and for English, the corresponding noun phrase entities, indicated in the curated database, can be selected for use in generating target language output examples in English to ensure the target output examples provide coverage that would cause a user to recognize the importance of the locative primitive.

In these and other manners, target language output examples can be generated in dependence on particularities for the target language, such as grammatical and/or morphological conventions of the target language (e.g., to ensure coverage) and/or particularities that are specific to the taxonomic classification of a corresponding target language primitive (e.g., to ensure semantic appropriateness). Generating target language output examples in view of orthographic conventions of the target language can ensure that generated and presented target language output examples test multiple bounds of the target language primitive in the context of the current target language NLG template portion. Generating target language output examples that are semantically appropriate can ensure the target language output examples are sensical and resonate with a reviewing user. This can increase the chances that a reviewing user ascertains an error with a currently defined target language NLG template, and corrects the error instead of submitting the currently defined target language NLG template as complete. This can additionally and/or alternatively make review of the currently defined target language NLG template more efficient, as the target language output examples are more likely to bring error(s) to the foreground, enabling quicker resolution and correction of the errors. This can additionally and/or alternatively enable a translator (vs. a more skilled linguist) to generate a target language NLG template via interaction(s) with a graphical user interface (GUI) and review of target language output examples—and without necessitating detailed interaction(s) directly with the target language NLG template.

The above is provided merely as an overview of some implementations. Those and/or other implementations are disclosed in more detail herein.

BRIEF DESCRIPTION OF THE DRAWINGS

FIG. 2A1, FIG. 2B1, and FIG. 2C1 illustrate an example graphical interface according to some implementations disclosed herein, and example adaptations that can occur responsive to user interaction with the graphical user interface.

FIG. 2A2, FIG. 2B2, FIG. 2C2, and FIG. 2D2 illustrate another example graphical interface according to some implementations disclosed herein, and additional or alternative example adaptations that can occur responsive to user interaction with the graphical user interface.

DETAILED DESCRIPTION

Figure 1:
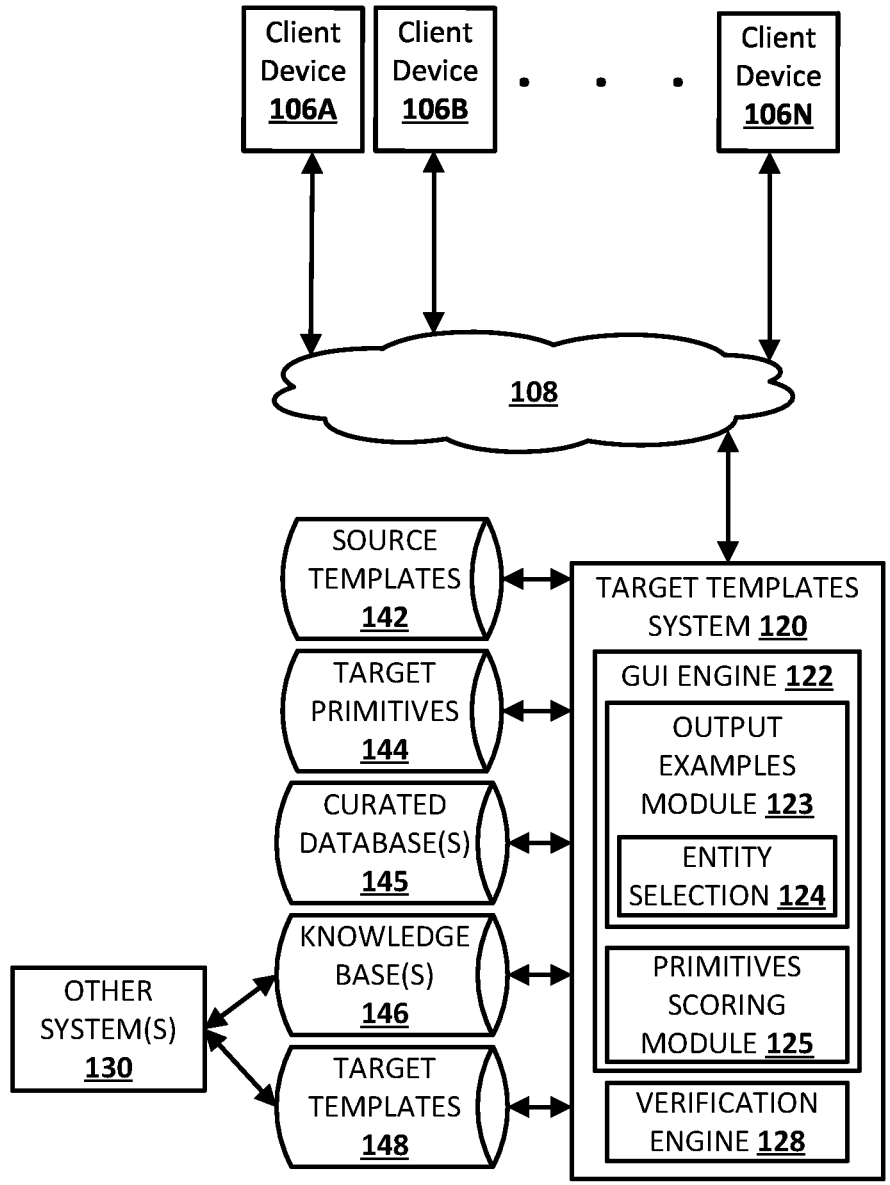
FIG. 1 is a block diagram of an example environment in which implementations disclosed herein may be implemented.

Turning initially to FIG. 1, an example environment is illustrated in which various implementations can be performed. FIG. 1 includes multiple client devices 106A-N, each of which can include corresponding web browsers and/or other application(s) for rendering graphical user interface(s) (GUI(s)) described herein and each of which can include corresponding input device(s) (e.g., keyboard, touchscreen, mouse, microphone(s)) for providing various input(s) to GUI(s) described herein. One or more of the client devices 106A-N can be utilized, by a corresponding user (e.g., a corresponding translator), in interacting with GUI(s) described herein in generating target language natural language generation (NLG) template(s) through review of target language output examples. Further, one or more of the client devices 106A-N (and/or other unillustrated client device(s)) can optionally be utilized by a corresponding reviewer (e.g., a corresponding linguist or translator) in verifying target language NLG template(s) generated by a translator. The corresponding reviewer can be a corresponding human that is in addition to the translator that generated the target language NLG template(s), such as another translator or a linguist.

The client devices 106A-N can include, for example: a desktop computing device, a laptop computing device, a tablet computing device, a mobile phone computing device, and/or a wearable apparatus that includes a computing device (e.g., a watch having a computing device, glasses having a computing device, a virtual or augmented reality computing device).

A target templates system 120 is also illustrated in FIG. 1, and can be implemented on one or more computing systems that are at least selectively communicatively coupled to client devices 106A-N via one or more local and/or wide area networks (e.g., the Internet) indicated generally at 108.

The target templates system 120 includes a GUI engine 122 that can generate one or more of the GUIs described herein. A generated GUI can be transmitted, via network(s) 108 to a corresponding one of the client devices 106A-N. Additionally, the GUI can be dynamically adapted responsive to user interface input(s) that are provided at the corresponding client device in generating a target language NLG template. The GUI engine 122 includes an output examples module 123 and a primitives scoring module 125.

In generating a GUI for facilitating generation of a target language NLG template that corresponds to a previously curated and previously verified source language NLG template, the GUI engine 122 can retrieve the source language NLG template from source templates database 142. Further, the GUI engine 122 can optionally include, in the GUI, a representation of the source language NLG template. As described herein, the representation can include static text of the template as well as a corresponding higher-level representation for each of the source language primitive(s) of the template.

In addition to or instead of including the already curated and verified source language NLG template, the GUI engine 122 can also include, in the GUI, an interactive target language NLG template portion. The interactive target language NLG template portion can include an area for defining the target language NLG template, and the area can include editable target static text with which a user can interact to define target static text, for a target language NLG template, that is in the target language.

The interactive target language NLG template portion can also include a plurality of candidate target language primitives, any one (or more) of which can be selected by a user for inclusion in the target language NLG template being curated via the GUI. For example, an affirmative selection of a target language primitive can cause it to be visually reflected, in a representation of the current target language NLG template, as part of the target language NLG template. For example, the target language primitive can be dragged and dropped into a desired position in the target language NLG template. The target language primitives that are included in the GUI can include some or all of the target language primitives of target primitives database 144. As described herein, the representation of a target language primitive, that is included in the GUI, can include a higher-level representation for the target language primitive.

In some implementations, the primitives scoring module 125 can generate a score for one or more of the target language primitives, of target primitives database 144, and a subset of those can be selected, by the GUI engine 122 for inclusion in the GUI, based on the score and/or the GUI engine 122 can present target language primitive(s), in the GUI, in a manner that is based on their scores. In some of the implementations where the primitives scoring module 125 generates scores for target language primitives, the scores can be dependent on the source language NLG template of the GUI and/or other data (e.g., the structured data). Put another way, a score for a candidate target language primitive can be dependent on the source language NLG template for which the target language NLG template is being generated. For example, it can be based on source language primitive(s) and/or source language static text of the source language NLG template. For instance, the score for the candidate target language primitive can be a function of how often the candidate target language primitive was utilized in target language NLG template(s) whose source language NLG template counterpart(s) included some or all of the source language primitive(s) and/or source language static text.

In some implementations, the interactive target language NLG template portion of the GUI can also include a target language output example portion. In those implementations, the output examples module 123 can generate the output examples, that are presented at a given time in the GUI, based on the target language NLG template that is currently defined in the GUI. In some of those implementations, the output examples, that are presented at another time in the GUI, can be generated based on utilizing a target language primitive, that is not included in the currently defined NLG template, responsive to certain user interface input directed to the target language primitive (e.g., "hovering over" user interface input). In generating the output examples, the output examples module 123 can generate the output examples using data from one or more knowledge base(s) 146 (e.g., a knowledge graph and/or other knowledge base(s)) and/or one or more curated databases 145—and based on corresponding constraint(s) for the currently defined target language primitive. In some implementations, the curated database(s) 145 can include linguistic attribute(s) and/or associated entities for a target language. The curated database(s) 145 and/or the knowledge base(s) 146 can be referenced, by an entity selection component 124 of output examples module 123, in selecting entities that provide coverage for defined attribute(s) of the target language and/or that are semantically appropriate for the target language NLG template.

In some implementations that generate target language output examples, the entity selection component 124 selects entities, based on which texts for a target language primitive are generated, based on defined attribute(s) of the target language and/or based on the target language NLG template (e.g., based on constraint(s) of the current target language primitive of the target language NLG template). For example, the entity selection component 124 can select, from knowledge base(s) 146, entities for output examples based on defined attribute(s), for the target language, and based on those defined attribute(s) being indicated, in curated database 145, as relevant to the target language NLG template. For instance, for Spanish and for a noun phrase taxonomic classification, the curated database 145 can indicate that gender and grammatical number of the noun phrases are impactful and/or can indicate that output examples should include masculine, feminine, plural, and singular entities to demonstrate the impact of gender and grammatical number. Accordingly, entities can be selected by the entity selection component 124, for use in generating the target language output examples, based on those entities collectively having corresponding Spanish noun phrases that cover all genders and grammatical numberings. Also, for example, the entity selection component 124 can select, from knowledge base(s) 146, entities for output examples additionally or alternatively based on determining that those entities are semantically appropriate for the NLG template. For instance, assume the NLG template has a target language primitive that includes a sports team taxonomic classification or includes (or is associated with) other data that indicates the NLG template is utilized to generate outputs related to sports teams. In response to the NLG template having the sports team indication, the entity selection component 124 can select, from knowledge base(s) 146, entities that have a sports team classification. The entity selection component can also optionally select those entities further based on those entities collectively having other defined attributes indicated as relevant in the curated database 145 (e.g., to cover all genders and grammatical numberings). In these and other manners, the entity selection component 124 can select entities to ensure output examples are semantically appropriate. For instance, a semantically appropriate output example such as "The Dodgers beat the Cubs 4 to 2" can be generated (where "Dodgers" and "Cubs" correspond to selected entities) instead of a semantically nonsensical output example such as "The cucumbers beat the cars 4 to 2" (where "cucumbers" and "cars" correspond to selected entities). In some implementations, the entity selection component 124 can be unable to select entities, that have the particular taxonomic classification indicated by the NLG template, and that also have other defined attributes indicated by the curated database 145 as impactful. This can be due to, for example, the curated database 145 lacking indications of which entities, with the particular taxonomic classification, have which of the defined attributes that are impactful for coverage. In some of those implementations, the entity selection component 124 can, in response to being unable to select such entities, instead select entities of a genus taxonomic classification, that encompasses the particular taxonomic classification, based on the curated database 145 including indications of which entities, with the genus taxonomic classification, have which of the defined attributes that are impactful for coverage. For example, assume the particular taxonomic classification is mammals, gender and grammatical numbering attributes are impactful, and that curated database 145 and/or entity database 146 lacks definition of gender and grammatical number for mammals. In response, the entity selection component 124 can select entities from the less granular taxonomic classification of animals (that encompasses mammals), based on the curated database 145 and/or entity database 146 including definition of gender and grammatical number for at least some animals (e.g., it can indicate which animal entities will collectively cover all genders and grammatical numberings). In these and other manners, the generated output examples can still be semantically appropriate on at least a genus level, while ensuring the generated output examples provide coverage for impactful attribute(s).

In some implementations, the output examples module 123 can, for at least some languages and in generating output examples that include at least certain numbers, cause spelled out numeric values (e.g., "uno") to be utilized for the numbers in lieu of the numeric values themselves (e.g., "1"). For example, assume an English language NLG template of "there is 1 [noun phrase]", and an initially defined Spanish language NLG template of "hay 1 [Sustantivo]". Instead of using "1" in the output examples, the output examples module can utilize "uno", resulting in output examples such as "hay uno estrella" and "hay uno perro", which are incorrect ("estrella" should be preceded by "una" and "perro" should be preceded by "un"). "Uno" can be utilized, for example, based on it being what would be spoken if "1" was provided to a Spanish text synthesis engine. As a result of utilizing "uno" instead of "1", the translator can recognize this error. In response to recognizing the error, the translator can modify the Spanish language NLG template to "hay [Un/Una+Sustantivo]. In response to this modification, the output examples would be updated, resulting in correct output examples such as "hay una estrella" and "hay un perro". In these and other manners, it can be ensured that synthesized speech, generated based on text generated using the NLG template, is grammatically correct.

Responsive to certain user interface input(s) at a corresponding GUI, the GUI engine 122 can determine that the current target language NLG template is complete. In response, the target language NLG template can be provided, by verification engine 128, to one or more additional of the client devices 106A-N for review by different user(s). Such review can optionally include presentation, at the corresponding client device(s) of one or more target language output examples generated by the output examples module 123. Optionally, one or more of the target language output examples can differ from those presented during generation of the target language NLG template. They can differ as a result of being generated based on different entities from the knowledge base(s) 146.

The verification engine 128 can verify the target language NLG template based on user interface inputs provided by the different reviewing users. For example, the verification engine 128 can verify the target language NLG template if user interface input from a threshold percentage of reviewing users indicate that the target language NLG template is accurate.

Once verified, the verification engine 128 can cause the target language NLG template to be stored in target templates database 148. Target templates database 148 can be accessible to other system(s) 130, and utilized by the other system(s) 130 in proactively and/or reactively generating natural language output, in the target language, for presentation to users. For example, the other system(s) 130 can utilize the target templates, of target templates database 148, in combination with knowledge base(s) 146, in generating proactive and/or reactive natural language output.

Turning now to FIGS. 2A1, 2B1, and 2C1, a non-limiting example of a GUI 250 is illustrated, and example adaptations to the GUI 250 that can occur responsive to user interaction with the GUI 250.

FIG. 2A1 represents an example of the GUI 250 when it is initially provided to a corresponding client device. The GUI 250 includes a representation of an English (source in this example) template 260 that is already created and already verified. The English template 260 includes source static text 262 and includes a source language primitive 264. The source language primitive 264 defines a taxonomic classification of a noun phrase that is a constraint of the source language primitive 264. It is noted that the representation of the source language primitive 264, illustrated in FIG. 2A, can vary from the underlying code utilized to enforce the source language primitive. In particular, it can be higher-level and more readily ascertainable by user(s) not skilled with crafting and/or interpreting the underlying code. In some implementations, the higher-level representation of the source language primitive 264 can be provided in the target language (e.g., to make it even more readily ascertainable by a corresponding translator), although the underlying primitive is for the source language. Additional and/or alternative constraints can be defined for primitives, such as those disclosed herein. Also, in various implementations the English template 260 can be omitted from the GUI 250 (e.g., the source language output examples 268 could be illustrated but not the English template 260).

FIG. 2A1 also illustrates four separate source language output examples 268. Each of the source language output examples 268 includes the source static text 262 and includes a corresponding dynamic value (indicated in underline) that is in the source language and that is generated using the constraint(s) defined by the source language primitive (represented by 264) and with reference to knowledge base(s). As described herein, the particular noun phrases selected, for the dynamic values of the source language output examples 268, can be selected based on defined attributes of the target language (Spanish, in the example of FIGS. 2A1-C1) for which the target language NLG template is being generated. Although those defined attributes may not be impactful for the source language, it can be beneficial, in some implementations, to use noun phrases, in the source language output examples 268, that correspond to those noun phrases to be used in target language output examples.

Also illustrated in FIG. 2A1 is an example interactive target language NLG template portion 270 of the GUI 250. The interactive target language NLG template portion 270 includes an area 280 for defining the target language NLG template. In FIG. 2A1, the area 280 includes editable target static text 282A1 that is in the target language. A user can interact with the target static text 282A1 (e.g., by clicking and then providing keyboard input(s)) to define target static text, for a target language NLG template, that is in the target language. In FIG. 2A1, the target static text 282A1 can be initial target text entered by the user via user interface input(s) (e.g., at a time before that represented by FIG. 2A1) or, alternatively, can be automatically generated using a machine translation and/or other technique(s).

In FIG. 2A1, the area 280 also includes an indication 284A1, indicating that the user needs to select, from a plurality of candidate target language primitives 290, a template for inclusion in the target language NLG template. In some other implementations, an initial one of the candidate target language primitives 290 can be automatically selected and inserted, without requiring user input. In some of those implementations, the initial one can be selected based on having the best score amongst the candidates 290, such as scores generated as described herein.

The illustrated candidate target language primitives 290 include a first 291, a second 292, a third 293, a fourth 294, and optional additional one(s) (as indicated by the vertical ellipsis). Further, as indicated by the "more" interface element 299, user interface input directed at the interface element 299 can cause additional candidate target language primitives to be presented.

The first 291 includes the higher-level descriptor of "El/La/Las/Los+Sustantivo", which indicates that it has a constraint of a noun/noun phrase("Sustantivo" is Spanish for noun), and a constraint that the noun will be preceded by an appropriate one of the definite articles "el", "la", "los", and "las". The second 292 includes the higher-level descriptor of "Sustantivo Sin Articulo", which indicates that it has a constraint of a noun/noun phrase, and that no article (e.g., "el", "la", "un", "una", etc.) will precede the noun. The third 293 includes the higher-level descriptor of "Un/Una+Sustantivo Singular", which indicates that it has a constraint of a singular noun/noun phrase, and that an appropriate singular indefinite article ("un" or "una") will precede the singular noun phrase. The fourth 294 includes the higher-level descriptor of "Los/Las+Sustantivo Plural", which indicates that it has a constraint of a plural noun/noun phrase, and that an appropriate plural definite article ("los" or "las") will precede the plural noun phrase. As described herein, the higher-level descriptors that are presented can differ from underlying regular expressions or other code that will actually be implemented in utilization of the primitives.

It is noted that, in some implementations, a score can be determined for each of the candidate target language primitives 290. In some of those implementations, the candidate target language primitives 290 can be selected (from a larger corpus of candidates), based on the scores, as those that are initially presented in the GUI 250 (e.g., in lieu of those accessible via the more interface element 299). Additionally or alternatively, the candidate target language primitives 290 can be presented, in the GUI 290, in a manner that is based on their scores. For example, where higher scores correspond to a greater degree of relevance than lower scores, first 291 can have the highest score, second 292 the second highest score, third 293 the third highest score, etc.

Turning now to FIG. 2B1, the GUI 250 of FIG. 2A1 is illustrated after a user selected the second 292 target language primitive through interaction with the GUI 250. For example, the user may have clicked the second 292 or dragged the second 292 over the indication 284A1. In FIG. 2B1, indication 284B1 is updated to reflect that the current target language NLG template is utilizing the second 292 and, further, the dashed line around second 292 (in candidate target language primitives 290) indicates it is currently in use.

FIG. 2B1 also illustrates four separate target language output examples 288B1. Each of the target language output examples 288B1 includes the currently defined target static text 282A1 and includes a corresponding dynamic value (indicated in underline) that is in the target language. The dynamic values can each be generated by replacing an argument, defined by the current target language primitive (represented by 284B1), with respective text for a respective entity. The respective entities utilized can be selected based on constraint(s) for the argument of the current target language primitive (e.g., to ensure semantic relevance) and/or other constraint(s) for the current target language primitive. As described herein, the particular noun phrases selected, for the dynamic values of the target language output examples 288B1, can additionally or alternatively be selected based on defined attributes of the target language, and optionally with reference to a curated database as described herein. For example, in FIG. 2B1, the particular noun phrases can be selected, for use in generating the target language output examples 288B, based on those entities collectively having corresponding Spanish noun phrases that cover all genders and grammatical numberings. For example, the noun phrase "coche" is masculine and singular, "coches" is masculine and plural, "camiseta" is feminine and singular, and "camisetas" is feminine and plural. In some implementations, the selected noun phrases can include those that are inherently singular and/or inherently plural. For example, inherently plural noun phrases can be used instead of "coches" and "camisetas", such as "pantalones" (masculine and inherently plural) and "tijeras" (feminine and inherently plural).

As illustrated by the target language output examples 288B1, they readily reveal an error with the currently defined target language NLG template. Namely, the reveal that it results in "el" being used as a definite article for feminine nouns and plural nouns, both of which are not grammatically correct for the Spanish language. A user can review the target language output examples 288B and interact with a check box beside each to mark those that are correct. As indicated by the blank check boxes 289, the user can recognize that the second, third, and fourth target language output examples 288B are incorrect.

In response to determining the target language output examples 288B1 are not all correct, the user can further interact with the area 280 to modify the currently defined target language NLG template. For example, and with reference to FIG. 2C1, the user can modify the target static text 282A1 (FIG. 2B1) to remove "el" and thereby generate the revised target static text 282C1. Further, the user can replace utilization of the second 292 target language primitive with utilization of the first 291 target language primitive. This is reflected by indication 284C1 and 291 now being provided in dashed line in candidate target language primitives 290.

FIG. 2C1 also illustrates four separate target language output examples 288C1 that are newly generated based on the refined currently defined target language NLG template of FIG. 2C1. Each of the target language output examples 288C1 includes the currently defined target static text 282C1 and includes a corresponding dynamic value (indicated in underline) that is in the target language and that is generated using the definite article ("el/la/las/los") constraint(s) defined by the current target language primitive (represented by 284C1), and by replacing an argument, defined by the current target language primitive (represented by 284C1), with respective text for a respective entity. The respective entities utilized can be selected based on constraint(s) for the argument of the current target language primitive (e.g., to ensure semantic relevance) and/or defined attribute(s) of the target language. As illustrated by the target language output examples 288C1, they readily reveal there are no errors with the currently defined target language NLG template of FIG. 2C1. As indicated by the checked boxes beside the examples 288C1, the user can recognize that the examples 288C1 are all correct.

In response to determining the target language output examples 288C are all correct, the user can select the submit interface element 272 to cause the target language NLG template, as currently defined in FIG. 2C1, to be stored in a database for use by other system(s), optionally after first being verified by reviewer(s). The unsolvable button 274 is selectable in situations where it is not possible to generate a target language counterpart for a source language NLG template or, at least the current user is unable to do so. If the unsolvable button 274 is selected, the attempt to generate a target language counterpart for a source language NLG template can be flagged for a further attempt at generating the target language counterpart (e.g., provided to a computational linguist who is more skilled than a translator utilizing the GUI 250) or, alternatively, no additional attempt to generate may be made.

Turning now to FIGS. 2A2, 2B2, 2C2, and 2D2, another non-limiting example of the GUI 250 is illustrated, and additional example adaptations to the GUI 250 that can occur responsive to user interaction with the GUI 250. FIGS. 2A1, 2B1, 2C2 and FIGS. 2A2, 2B2, 2C2, and 2D2 share many aspects in common. Accordingly, the same numbering amongst the figures refers to similar features. However, the GUI 250 of FIGS. 2A2, 2B2, 2C2, and 2D2 illustrate additional and/or alternative GUIs and/or adaptations that can be utilized in various implementations.

FIG. 2A2 represents another example of the GUI 250 when it is initially provided to a corresponding client device. In contrast to FIG. 2A1, in FIG. 2A2 the area 280 includes editable static text 282A2 that is still in the source language (i.e., it matches the source static text 262). Also in contrast to FIG. 2A1, in FIG. 2A2 the area 280 includes indication 284A2 that reflects the first 291 of the target language primitives 290 is included in the current target NLG template represented by the area 280. The first 291 can be automatically selected and inserted in the target NLG template, without requiring user input, based on having the best score amongst the candidates 290. Also in contrast to FIG. 2A1, in FIG. 2A2 the interactive target language NLG template portion 270 also initially includes four separate target language output examples 288A2. Each of the target language output examples 288A2 includes the currently defined static text 282A2 and includes a corresponding value (indicated in underline) that is in the target language. The values can each be generated by replacing an argument, defined by the current target language primitive (represented by 284A2), with respective text for a respective entity.

Turning now to FIG. 2B2, the GUI 250 of FIG. 2A2 is illustrated after a user edited the static text 282A2 in the source language, to replace it with initially translated (by the user) static text 282B2 in the target language. For example, the user may have clicked in the area 280 and utilized a physical and/or virtual keyboard to delete the static text 282A2 that is in the source language and type the static text 282B2 that is in the target language. In FIG. 2B2, the target language output examples 288B2 are updated, relative to the target language output examples 288A2 of FIG. 2A2, to reflect the user's replacement of the static text 282A2 with the target static text 282B2. For example, the target language output examples 288B2 of FIG. 2B2 can be updated in real time as the user edits the static text in the area 280.

From reviewing the target language output examples 288A2 of FIG. 2A2, the user can recognize that each of the output examples 288A2 erroneously includes multiple adjacent articles (e.g., "el el" in the first of the output examples 288A2, "el los" in the second of the output examples, etc.). The user can recognize this error and further interact with the GUI 250 in remedying the error.

For example, and with reference to FIG. 2C2, the user can hover a cursor 201 over the second 292 of the target language primitives 290 based on the higher-level descriptor of the second ("Sustantivo Sin Articulo") indicating it has a constraint of a noun/noun phrase, and that no article will precede the noun (thereby remedying the multiple adjacent article error). In response to hovering the cursor over the second 292, updated output examples 288C2 are generated that utilize the second 292 of the target language primitive 290 in lieu of the first 291 that is utilized in FIG. 2B2. However, notably, in FIG. 2C2 the second 292 does not replace the first 291 in the area 280 since it has not been affirmatively selected via affirmative user interface input(s).

From reviewing the updated output examples 288C2 of FIG. 2C2, the user can recognize that some of the output examples 288C2 include errors with gender and/or grammatical number. In particular, "el coches" should be "los coches", "el camiseta" should be "la camiseta", and "el camisetas" should be "las camisetas".

The user can recognize this error and further interact with the GUI 250 in remedying the error. For example, the user can cease hovering the cursor 201 over the second 292 of the target language primitives 290, thereby causing the output examples to revert back to the output examples of FIG. 2B2 (target language output examples 288B2) that utilize the first 291 of the target language primitives 290. Further, and with reference to FIG. 2D2, the user can edit the target static text 282B2 of FIG. 2C2, to replace it with target static text 282D2, of FIG. 2D2, which removes "el". In response, and as illustrated in FIG. 2D2, the target language output examples 288D2 are updated to reflect the user's deletion of "el" (i.e., they are the same as the target language output examples 288B2, but no longer include the static "el" text due to the user's edit). The user can then recognize that the target language output examples 288D2 are all correct, and select the submit interface element 272 to cause the target language NLG template, as currently defined in FIG. 2D2, to be stored in a database for use by other system(s).

Figure 3:
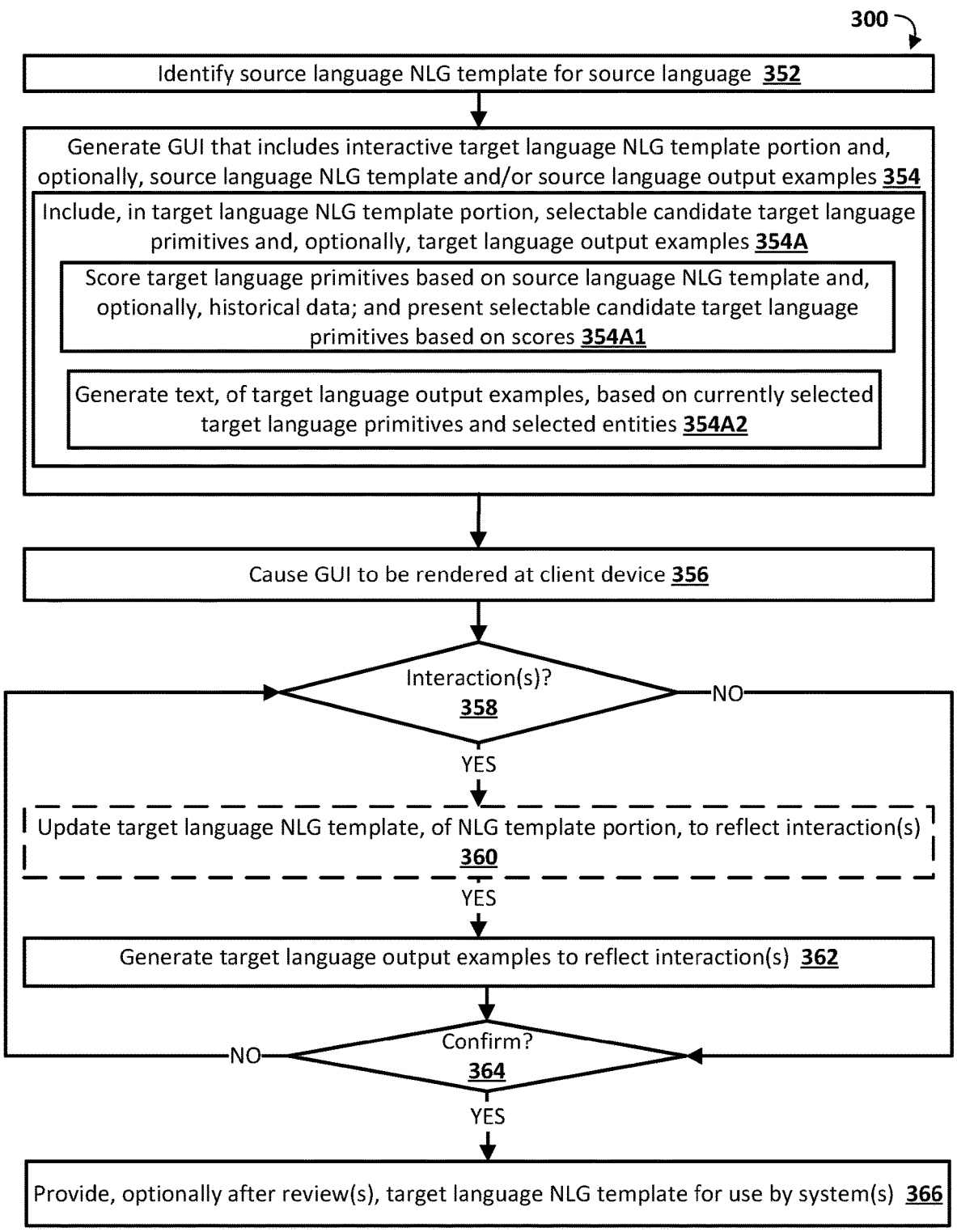
FIG. 3 is a flowchart illustrating an example method according to implementations disclosed herein.

FIG. 3 is a flowchart illustrating an example method 300 according to implementations disclosed herein. For convenience, the operations of the flow chart are described with reference to a system that performs the operations. This system may include various components of various computer systems, such as one or more components of target templates system 120 of FIG. 1. Moreover, while operations of method 300 are shown in a particular order, this is not meant to be limiting. One or more operations may be reordered, omitted or added.

At block 352, the system identifies a source language NLG template for a source language.

At block 354, the system generates a GUI that includes an interactive target language NLG template portion and, optionally, the source NLG template and/or source language output examples. The source language output examples, when included, can each be generated based on the source language NLG template, but can each include different selected text for argument(s) of the source language NLG template. In some implementations, block 354 includes sub-block 354A.

At sub-block 354A, the system includes, in the target language NLG template portion of the GUI, selectable candidate target language primitives and, optionally, target language output examples. In some of those implementations, sub-block 354A includes sub-block 354A1 and/or sub-block 345A2.

At sub-block 354A1, the system scores target language primitives based on the source language NLG template and, optionally, historical data. For example, the system can score a candidate target language primitive based on whether and/or how frequently it was utilized, as reflected by historical data, in generating other target language NLG templates for other source language NLG templates having similar feature(s) to those of the current source language NLG template. In those implementations, block 354A1 further includes presenting the selectable candidate target language primitives based on the scores. For example, the system can determine, based on the scores, whether and/or how to present target language primitives as candidates.

At sub-block 354A2, the system generates text, of the target language output examples, based on the currently selected target language primitive and based on selected entities. When the currently defined target NLG template includes target static text, the system will also include, in each of the target language output examples, the static text.

In some implementations, the selected entities are selected based on defined attribute(s) of the target language (e.g., to ensure that the target language output examples provide coverage for orthographic attribute(s) of the target language) and/or based on a taxonomic classification (e.g., one defined by constraint(s)) of the target language primitive and/or its source language primitive counterpart (e.g., to ensure the target language output examples are semantically appropriate).

At block 356, the system causes the GUI, generated in block 354, to be rendered at a client device. For example, the system can transmit the GUI to the client device for rendering by a browser or other application of the client device.

At block 358, the system monitors for interaction(s), with the target language NLG template portion of the GUI, that impact the target language output examples. Those interaction(s) that impact the target language output examples can include, for example, affirmative selection of a target language primitive (to include it as part of the current target language NLG template), hovering over a target language primitive, editing of target static text of the target language NLG template (note the target language output examples will include the target static text as it is currently defined), and/or repositioning current target language primitive(s) in the current target language NLG template. At block 364, the system monitors for interaction with a confirmation interface element (e.g., the submit interface element 272 of FIGS. 2A1-C1 and 2A2-D2). Blocks 358 and 364 can be performed in parallel to simultaneously monitor for interaction(s) with the NLG template portion and monitor for interaction with the confirmation interface element. Additional interaction(s) with the GUI can also optionally be monitored (e.g., interactions with an unsolvable interface element described herein).

In response to detecting certain interaction(s) at block 358, the system proceeds to block 360 and/or block 362. The system can proceed to both block 360 and block 362 when the interaction(s) of block 358 affect the currently defined target language NLG template. The system can proceed to block 362 (without proceeding to block 360), when the interaction(s) of block 358 do not affect the currently defined target language NLG template (e.g., when the interaction is a hover interaction). At block 360, the system updates a current target language NLG template, of the NLG template portion, to reflect those interaction(s). For example, if the interaction(s) include modifying the target static text of the target language NLG template, the current target language NLG template can be updated to reflect the updated target static text. As another example, if the interaction(s) include supplanting a target language primitive with an alternate target language primitive (through an affirmative selection of the alternate target language primitive), the current target language NLG template can be updated to reflect the alternate target language primitive.

At block 362, the system generates target language output examples to reflect the interaction(s) of block 358. For example, the system can generate the target language output examples based on the target language NLG template, as most recently updated based on the most recent interaction(s) of block 358. For instance, if the most recent interaction(s) of block 358 included adding a term to the static text, adding of that term could be reflected in the target language output examples (e.g., by including the added term). As another example, the system can generate the target language output examples based on the current target language NLG template, but supplanting a current target language primitive of the current target language NLG template with an alternate target language primitive that is the subject of a hover interaction. In some implementations, block 362 can include a sub-block that is the same (or similar to) sub-block 354A2 described above.

In response to detecting interaction with a confirm interface element at block 364, the system proceeds to block 366 and provides, optionally after review(s), the target language NLG template for use by other system(s). The target language NLG template that is provided will be the current target NLG template as most recently defined by user interaction(s) with the GUI.

Figure 4:
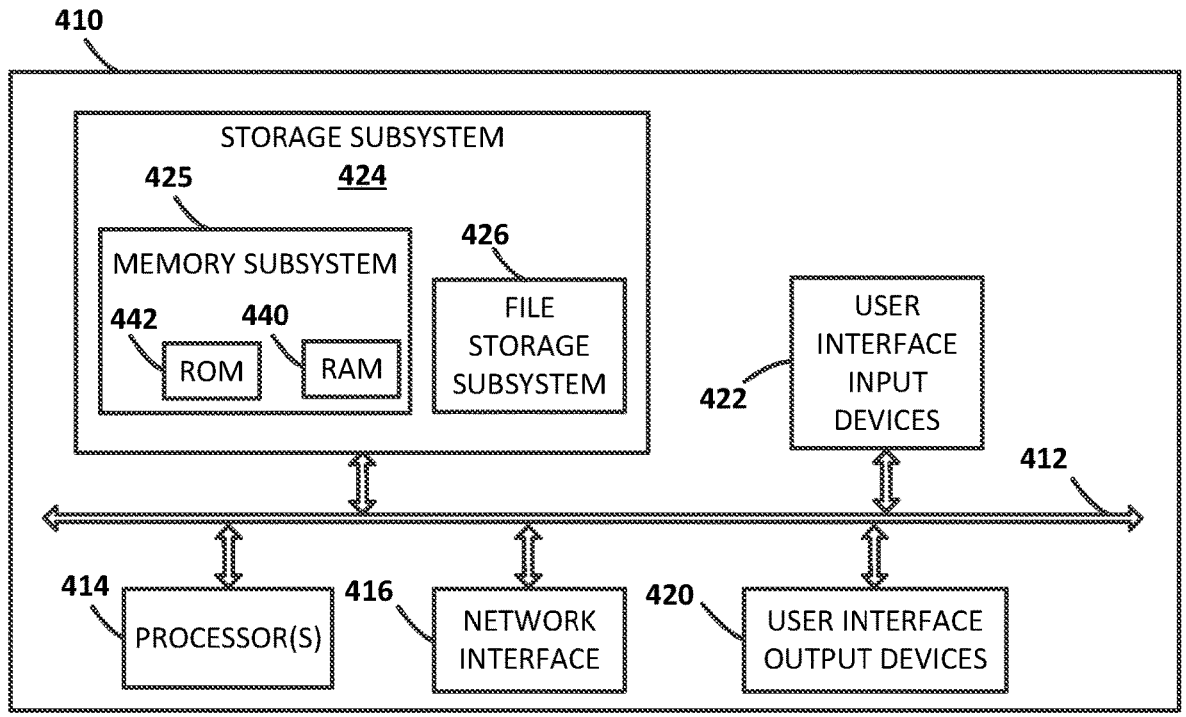
FIG. 4 illustrates an example architecture of a computing device.

FIG. 4 is a block diagram of an example computing device 410 that may optionally be utilized to perform one or more aspects of techniques described herein. In some implementations, one or more of a client computing device, and/or other component(s) may comprise one or more components of the example computing device 410.

Computing device 410 typically includes at least one processor 414 which communicates with a number of peripheral devices via bus subsystem 412. These peripheral devices may include a storage subsystem 424, including, for example, a memory subsystem 425 and a file storage subsystem 426, user interface output devices 420, user interface input devices 422, and a network interface subsystem 416. The input and output devices allow user interaction with computing device 410. Network interface subsystem 416 provides an interface to outside networks and is coupled to corresponding interface devices in other computing devices.

User interface input devices 422 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 410 or onto a communication network.

User interface output devices 420 may include a display subsystem, a printer, a fax machine, or non-visual displays such as audio output devices. The display subsystem may include a cathode ray tube ("CRT"), a flat-panel device such as a liquid crystal display ("LCD"), a projection device, or some other mechanism for creating a visible image. The display subsystem may also provide non-visual display such as via audio output devices. In general, use of the term "output device" is intended to include all possible types of devices and ways to output information from computing device 410 to the user or to another machine or computing device.

Storage subsystem 424 stores programming and data constructs that provide the functionality of some or all of the modules described herein. For example, the storage subsystem 424 may include the logic to perform selected aspects of one or more of the methods described herein, and/or to implement various components depicted herein.

These software modules are generally executed by processor 414 alone or in combination with other processors. Memory 425 used in the storage subsystem 424 can include a number of memories including a main random access memory ("RAM") 440 for storage of instructions and data during program execution and a read only memory ("ROM") 442 in which fixed instructions are stored. A file storage subsystem 426 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 426 in the storage subsystem 424, or in other machines accessible by the processor(s) 414.

Bus subsystem 412 provides a mechanism for letting the various components and subsystems of computing device 410 communicate with each other as intended. Although bus subsystem 412 is shown schematically as a single bus, alternative implementations of the bus subsystem may use multiple busses.

Computing device 410 can be of varying types including a workstation, server, computing cluster, blade server, server farm, or any other data processing system or computing device. Due to the ever-changing nature of computers and networks, the description of computing device 410 depicted in FIG. 4 is intended only as a specific example for purposes of illustrating some implementations. Many other configurations of computing device 410 are possible having more or fewer components than the computing device depicted in FIG. 4.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method implemented by one or more processors is provided and includes identifying, from a database, a source language natural language generation (NLG) template for a source language. The source language NLG template includes source static text that is in the source language and includes a source language primitive that defines an argument. The method further includes determining, from a corpus of candidate entities and based on defined attributes of a target language, a subset of candidate entities for the argument, and generating a graphical user interface. The graphical user interface includes an interactive target language NLG template portion. The interactive target language NLG template portion includes selectable candidate target language primitives, for the target language, that are each a candidate for utilization, in a target NLG template, in lieu of the source language primitive. The method further includes causing the graphical user interface to be rendered at a client device. The method further includes receiving user input directed to a given target language primitive, of the candidate target language primitives. The user input is via one or more user interface inputs, at the client device, that are directed to the interactive target language NLG template portion. The method further includes, in response to receiving the user input directed to the given target language primitive: generating a plurality of output examples that are in the target language and that each include a target language translation of the source static text and a corresponding dynamic text for the given target language primitive; and causing the plurality of output examples to be rendered at the client device in the graphical user interface. The corresponding dynamic texts are each generated based on a respective entity of the subset of candidate entities, and are each generated based on any additional constraints imposed by the given target language primitive.

These and other implementations of the technology disclosed herein can include one or more of the following features.

In some implementations, the method further includes receiving, via one or more additional user interface inputs at the graphical user interface, confirmatory input that confirms the target NLG template as including at least the target language translation of the source static text and the given source language primitive. In some versions of those implementations, the method further includes, based on receiving the confirmatory input, utilizing the target NLG template in generating multiple instances of user interface output provided at multiple disparate client devices. In some of those versions, the method further includes, in response to the confirmatory input and prior to utilizing the target NLG template in generating the multiple instances of user interface output, providing the target NLG template to one or more additional client devices based on the one or more additional client devices being designated as reviewer client devices. Utilizing the target NLG template in generating the multiple instances of user interface output can be further based on receiving certain feedback from the one or more additional client devices.

In some implementations, the interactive target language NLG template portion further includes an editable text portion and the method further includes receiving one or more additional user interface inputs that define the target language translation of the source static text. In some of those implementations, the source static text includes a particular term and the target language translation of the source static text lacks any counterpart to the particular term.

In some implementations, the given target language primitive includes one or more of the additional constraints. In some of those implementations, the one or more of the additional constraints includes a definiteness constraint, a case constraint, a preposition constraint, and/or a number agreement constraint.

In some implementations, the given target language primitive includes one or more of the additional constraints, and the one or more of the additional constraints includes an additional constraint that causes dynamic texts, generated using the given target language primitive, to vary in dependence on the entity utilized in generating the dynamic text and/or in dependence on one or more other target language primitives of the target NLG template.

In some implementations, the given target language primitive includes one or more of the additional constraints, and the source language primitive lacks at least one of the additional constraints.

In some implementations, the defined attributes of the target language include one or more gender attributes, one or more number attributes, and/or grammatical case.

In some implementations, determining, from the corpus of candidate entities, the subset of candidate entities, further includes: selecting the subset of candidate entities based on the subset of candidate entities having a taxonomic classification and based on the taxonomic classification being defined as a constraint for the argument. In some versions of those implementations, determining, from the corpus of candidate entities, the subset of candidate entities, includes selecting the subset of candidate entities from a previously curated database that was curated based on the defined attributes of the target language and selecting the subset of candidate entities based on the subset of candidate entities being defined, in the curated database, as having the taxonomic classification. In some of those versions, the taxonomic classification is in a knowledge graph or other entity data base.

In some implementations, the method further includes: determining, based on the source language primitive, a corresponding score for each of the selectable candidate target language primitives; and determining a presentation order, of the selectable candidate target language primitives, based on the score.

In some implementations, the graphical user interface further includes a plurality of source output examples that are in the source language and that each include the source static text and a corresponding dynamic source text for the source language primitive. The corresponding dynamic source texts are each generated based on a respective entity of the subset of candidate entities.

In some implementations, the method further includes, prior to receiving the user input directed to the given target language primitive: automatically selecting an initial target language primitive that is distinct from the given target language primitive; generating a plurality of initial output examples that are in the target language and that each include the target language translation of the source static text and a corresponding initial dynamic text for the given target source language primitive; and causing the plurality of initial output examples to be rendered at the client device in the graphical user interface. In some of those implementations, the corresponding initial dynamic texts are each generated based on a respective corresponding entity of the subset of candidate entities, and are each generated based on any additional constraints imposed by the initial target language primitive. Further, in some of those implementations, the user input directed to the given target language primitive causes the plurality of output examples to supplant, in the graphical user interface, the plurality of initial output examples.

In some implementations, the method further includes, subsequent to receiving the user input directed to the given target language primitive and causing the plurality of output examples to be rendered: receiving one or more further user inputs directed at the interactive target language NLG template portion; generating a plurality of updated output examples that are in the target language and that reflect the one or more further user inputs; and causing the plurality of updated output examples to be rendered at the client device in the graphical user interface. In some of those implementations, the one or more further user inputs alter the target language translation, add an additional target language primitive, remove the given target language primitive, reposition the given target language primitive relative to the target static text, edit the target static text, and/or select what element agrees with a target language primitive (and optionally provide examples of different forms of agreement for the target language primitive).

In some implementations, the user input directed to the given target language primitive is a user input without an affirmative selection of the given target language primitive—such as a hover over the given target language primitive or a focus input directed to the given target language primitive. An affirmative selection of the given target language primitive causes it to be incorporated as a current primitive for a target language NLG template.

In some implementations, a method implemented by one or more processors is provided and includes identifying, from a database, a source language natural language generation (NLG) template for a source language. The source language NLG template includes source static text that is in the source language and includes a source language primitive that defines a taxonomic classification. The method further includes determining, based on the taxonomic classification and/or the source language static text, a corresponding score for each of a plurality of selectable candidate target language primitives. The method further includes determining a presentation order, of the selectable candidate target language primitives, based on the score. The method further includes generating a graphical user interface that includes an interactive target language NLG template portion. The interactive target language NLG template portion includes the selectable candidate target language primitives in the presentation order. The method further includes causing the graphical user interface to be rendered at a client device and receiving a user selection of a given target language primitive of the candidate target language primitives. The user selection is via one or more user interface inputs, at the client device, that are directed to the interactive target language NLG template portion. The method further includes, in response to receiving the user selection of the given target language primitive: generating a plurality of output examples that are in the target language and that each include a target language translation of the source static text and a corresponding dynamic text for the given target language primitive; and causing the plurality of output examples to be rendered at the client device in the graphical user interface.

In some implementations, a method implemented by one or more processors is provided and includes identifying, from a database, a source language natural language generation (NLG) template for a source language. The source language NLG template includes source static text that is in the source language. The method further includes generating a graphical user interface that includes: a plurality of source output examples that are in the source language and that are each generated based on the source language NLG template; and an interactive target language NLG template portion. The interactive target language NLG template portion includes: selectable candidate target language primitives, for the target language, that are each a candidate for utilization, in a target NLG template that corresponds to the source language target NLG template. The method further includes causing the graphical user interface to be rendered at a client device. The method further includes receiving a user selection directed to a given target language primitive, of the candidate target language primitives. The user selection is via one or more user interface inputs, at the client device, that are directed to the interactive target language NLG template portion. The method further includes, in response to receiving the user input directed to selection of the given target language primitive: generating a plurality of target output examples that are in the target language and that each include a target language translation of the source static text and a corresponding dynamic text for the given target source language primitive, the corresponding dynamic texts each being generated based on a respective entity selected based on defined attributes of the target language; and causing the plurality of target output examples to be rendered at the client device, in the graphical user interface, and along with the source output examples.

In addition, some implementations may include a system including one or more devices, each with one or more processors and memory operably coupled with the one or more processors, where the memory(ies) of the one or more devices store instructions that, in response to execution of the instructions by the one or more processors of the one or more assistant devices, cause the one or more processors to perform any of the methods described herein. Some implementations also include at least one non-transitory computer-readable medium including instructions that, in response to execution of the instructions by one or more processors, cause the one or more processors to perform any of the methods described herein.

What is claimed is:

1. A method implemented by one or more processors, the method comprising:
   identifying, from a database, a source language natural language generation (NLG) template for a source language,
      wherein the source language NLG template comprises natural language source static text that is in the source language and comprises a natural language source language primitive that defines an argument;
   determining, from a corpus of candidate entities and based on defined attributes of a target language, a subset of candidate entities for the argument;
   generating a graphical user interface that includes:
      a source language NLG portion including:
         the natural language source language primitive, and
         a natural language source language example including the natural language source static text and a candidate entity, of the subset of candidate entities, in the source language, and in lieu of the natural language source language primitive, wherein the candidate entity semantically corresponds with the natural language source static text; and
      an interactive target language NLG template portion including:
         a target language translation of the natural language source static text, and
         a modifiable element corresponding to natural language selectable candidate target language primitives that are unique and simultaneously displayed upon initial rendering of the interactive target language NLG template portion and that are each a candidate for
      utilization, in a target NLG template, in lieu of the modifiable element;
   causing the graphical user interface to be rendered at a client device;
   receiving user input directed to a given target language primitive, of the unique simultaneously displayed natural language selectable candidate target language primitives, the user input being via one or more user interface inputs, at the client device, that are directed to the interactive target language NLG template portion; and
   in response to receiving the user input directed to the given target language primitive:
      generating a plurality of unique output examples that are in the target language and that each include a natural language target language translation of the source static text and a corresponding dynamic text for the given target language primitive, the corresponding dynamic texts each being generated based on a respective entity of the subset of candidate entities, and each being generated based on any additional constraints imposed by the given target language primitive; and causing the plurality of unique output examples to be simultaneously rendered at the client device in the graphical user interface.

2. The method of claim 1, further comprising:
receiving, via one or more additional user interface inputs at the graphical user interface, confirmatory input that confirms the target NLG template as including at least the target language translation of the source static text and the given source language primitive; and
based on receiving the confirmatory input, utilizing the target NLG template in generating multiple instances of user interface output provided at multiple disparate client devices.

3. The method of claim 2, further comprising:
in response to the confirmatory input and prior to utilizing the target NLG template in generating the multiple instances of user interface output:
providing the target NLG template to one or more additional client devices based on the one or more additional client devices being designated as reviewer client devices;
wherein utilizing the target NLG template in generating the multiple instances of user interface output is further based on receiving certain feedback from the one or more additional client devices.

4. The method of claim 1, wherein the interactive target language NLG template portion further includes an editable text portion and further comprising receiving one or more additional user interface inputs that define the target language translation of the source static text.

5. The method of claim 4, wherein the source static text includes a particular term and wherein the target language translation of the source static text lacks any counterpart to the particular term.

6. The method of claim 1, wherein the given target language primitive includes one or more of the additional constraints, and wherein the one or more of the additional constraints includes a definiteness constraint, a case constraint, a preposition constraint, and/or a number agreement constraint.

7. The method of claim 1, wherein the given target language primitive includes one or more of the additional constraints, and wherein the one or more of the additional constraints includes an additional constraint that causes dynamic texts, generated using the given target language primitive, to vary in dependence on the entity utilized in generating the dynamic text and/or in dependence on one or more other target language primitives of the target NLG template.

8. The method of claim 1, wherein the given target language primitive includes one or more of the additional constraints, and wherein the source language primitive lacks at least one of the additional constraints.

9. The method of claim 1, wherein the defined attributes of the target language include one or more gender attributes, one or more number attributes, and/or grammatical case.

10. The method of claim 1, wherein determining, from the corpus of candidate entities, the subset of candidate entities, further comprises:
selecting the subset of candidate entities based on the subset of candidate entities having a taxonomic classification and based on the taxonomic classification being defined as a constraint for the argument.

11. The method of claim 10, wherein determining, from the corpus of candidate entities, the subset of candidate entities, comprises selecting the subset of candidate entities from a previously curated database that was curated based on the defined attributes of the target language and selecting the subset of candidate entities based on the subset of candidate entities being defined, in the curated database, as having the taxonomic classification.

12. The method of claim 10, wherein the taxonomic classification is in a knowledge graph or other entity database.

13. The method of claim 1, further comprising:
determining, based on the source language primitive, a corresponding score for each of the selectable candidate target language primitives; and
determining a presentation order, of the selectable candidate target language primitives, based on the score.

14. The method of claim 1, wherein the graphical user interface further includes a plurality of source output examples that are in the source language and that each include the source static text and a corresponding dynamic source text for the source language primitive, the corresponding dynamic source texts each being generated based on a respective entity of the subset of candidate entities.

15. The method of claim 1, further comprising:
prior to receiving the user input directed to the given target language primitive:
automatically selecting an initial target language primitive that is distinct from the given target language primitive;
generating a plurality of initial output examples that are in the target language and that each include the target language translation of the source static text and a corresponding initial dynamic text for the given target source language primitive, the corresponding initial dynamic texts each being generated based on a respective corresponding entity of the subset of candidate entities, and each being generated based on any additional constraints imposed by the initial target language primitive; and
causing the plurality of initial output examples to be rendered at the client device in the graphical user interface,
wherein the user input directed to the given target language primitive causes the plurality of output examples to supplant, in the graphical user interface, the plurality of initial output examples.

16. The method of claim 1, further comprising:
subsequent to receiving the user input directed to the given target language primitive and causing the plurality of output examples to be rendered:
receiving one or more further user inputs directed at the interactive target language NLG template portion, wherein the one or more further user inputs alter the target language translation, add an additional target language primitive, remove the given target language primitive, and/or reposition the given target language primitive relative to the target static text;
generating a plurality of updated output examples that are in the target language and that reflect the one or more further user inputs; and
causing the plurality of updated output examples to be rendered at the client device in the graphical user interface.

17. The method of claim 1, wherein the user input directed to the given target language primitive is a hover over the given target language primitive or a focus input directed to the given target language primitive, without an affirmative selection of the given target language primitive, and wherein the affirmative selection of the given target language primitive causes it to be incorporated as a current primitive for a target language NLG template.

18. A method implemented by one or more processors, the method comprising:
identifying, from a database, a source language natural language generation (NLG) template for a source language,
wherein the source language NLG template comprises natural language source static text that is in the source language and comprises a natural language source language primitive that defines a taxonomic classification;
determining, based on the taxonomic classification and/or the source language static text, a corresponding score for each of a plurality of natural language selectable candidate target language primitives;
determining a presentation order, of the natural language selectable candidate target language primitives, based on the score;
generating a graphical user interface that includes:
a source language NLG portion including:
the natural language source language primitive, and
a source language example including the natural language source static text and a candidate entity in lieu of the natural language source language primitive;
an interactive target language NLG template portion, wherein the interactive target language NLG template portion includes:
a target language translation of the natural language source static text,
a modifiable element corresponding to the natural language selectable candidate target language primitives, in the presentation order, that are unique and simultaneously displayed upon initial rendering of the NLG template portion, in lieu of the source language primitive;
causing the graphical user interface to be rendered at a client device;
receiving a user selection of a given target language primitive, of the unique and simultaneously displayed natural language selectable candidate target language primitives, the user selection being via one or more user interface inputs, at the client device, that are directed to the interactive target language NLG template portion; and
in response to receiving the user selection of the given target language primitive:
generating a plurality of unique output examples that are in the target language and that each include the target language translation of the natural language source static text and a corresponding dynamic text for the given target language primitive; and
causing the plurality of unique output examples to be simultaneously rendered at the client device in the graphical user interface.

19. The method of claim 18, wherein the interactive target language NLG template portion further includes an editable text portion and further comprising receiving one or more additional user interface inputs that define the target language translation of the source static text.

20. A method implemented by one or more processors, the method comprising:
identifying, from a database, a source language natural language generation (NLG) template for a source language,
wherein the source language NLG template comprises natural language source static text that is in the source language;
generating a graphical user interface that includes:
a plurality of natural language source output examples that are in the source language, that include the natural language source static text and an entity corresponding to a source language primitive, and that are each generated based on the source language NLG template;
an interactive target language NLG template portion, wherein the interactive target language NLG template portion includes:
a modifiable element corresponding to selectable natural language candidate target language primitives, for the target language, that are unique and simultaneously displayed upon initial rendering of the NLG template portion and that are each a candidate for utilization, in a target NLG template that corresponds to the source language target NLG template, in lieu of the source language primitive;
causing the graphical user interface to be rendered at a client device;
receiving user input directed to a given target language primitive, of the unique simultaneously displayed natural language candidate target language primitives, the user input being via one or more user interface inputs, at the client device, that are directed to the interactive target language NLG template portion; and
in response to receiving the user input directed to selection of the given natural language target language primitive:
generating a plurality of unique target output examples that are in the target language and that each include a target language translation of the natural language source static text and a corresponding natural language dynamic text for the given natural language target language primitive, the corresponding natural language dynamic texts each being generated based on a respective entity selected based on defined attributes of the target language; and
causing the plurality of unique target output examples to be simultaneously rendered at the client device, in the graphical user interface, and along with the source output examples.

* * * * *